United States Patent

Lienemann et al.

[15] 3,670,671
[45] June 20, 1972

[54] PLANTER

[72] Inventors: Darlo Lienemann, Clarendon Hills; Daniel Henry, Downers Grove, both of Ill.

[73] Assignee: International Harvester Company, Chicago, Ill.

[22] Filed: Jan. 6, 1970

[21] Appl. No.: 998

[52] U.S. Cl. ............................. 111/77, 221/185, 221/220, 222/177, 222/407, 222/414
[51] Int. Cl. ............................. A01c 7/18, G01f 11/20
[58] Field of Search ................ 111/77; 222/407, 177, 414; 221/217–220, 185

[56] References Cited

UNITED STATES PATENTS

| | | | |
|---|---|---|---|
| 3,587,938 | 6/1971 | Brown | 222/407 |
| 3,618,820 | 11/1971 | Keeton | 221/219 |
| 3,612,350 | 10/1971 | Morkoski et al. | 221/219 |
| 1,371,343 | 3/1921 | Bow | 222/407 |
| 3,572,547 | 3/1971 | Walberg | 221/220 |
| 444,645 | 1/1891 | Friederich | 111/77 |
| 375,036 | 12/1887 | Williams | 221/217 |
| 607,502 | 7/1898 | Caldwell | 111/77 |
| 886,253 | 4/1908 | Roseland | 221/217 |
| 1,461,770 | 1/1923 | Ellis et al. | 221/217 |
| 1,566,424 | 12/1925 | Poleschensky | 221/219 |
| 2,613,850 | 10/1952 | Varco | 221/217 |
| 2,765,942 | 4/1954 | Vogelsang | 111/77 |
| 3,219,000 | 11/1965 | Leach et al. | 111/77 |
| 3,308,774 | 4/1967 | Keeton | 111/77 |
| 3,348,504 | 10/1967 | Fischer | 111/77 |
| 3,498,241 | 4/1970 | Fischer | 111/77 |
| 3,552,601 | 1/1971 | Hansen et al. | 111/77 |

FOREIGN PATENTS OR APPLICATIONS

| | | | |
|---|---|---|---|
| 218,287 | 11/1961 | Austria | 111/77 |
| 97,215 | 1/1964 | Denmark | 111/77 |

Primary Examiner—Robert E. Pulfrey
Assistant Examiner—C. W. Hanor
Attorney—Noel G. Artman

[57] ABSTRACT

A planter for seed of different size of shape wherein a seed wheel or rotor is rotatably mounted in a housing having a stationary wall surrounding the rotor and a seed supply. Inwardly yieldable fingers are mounted on the rotor to pass through the seed supply, select a seed and press it against the wall, said wall being adapted to urge the fingers inwardly and having an outlet therein accommodating outward movement of the successive of said fingers to discharge the seed.

3 Claims, 11 Drawing Figures

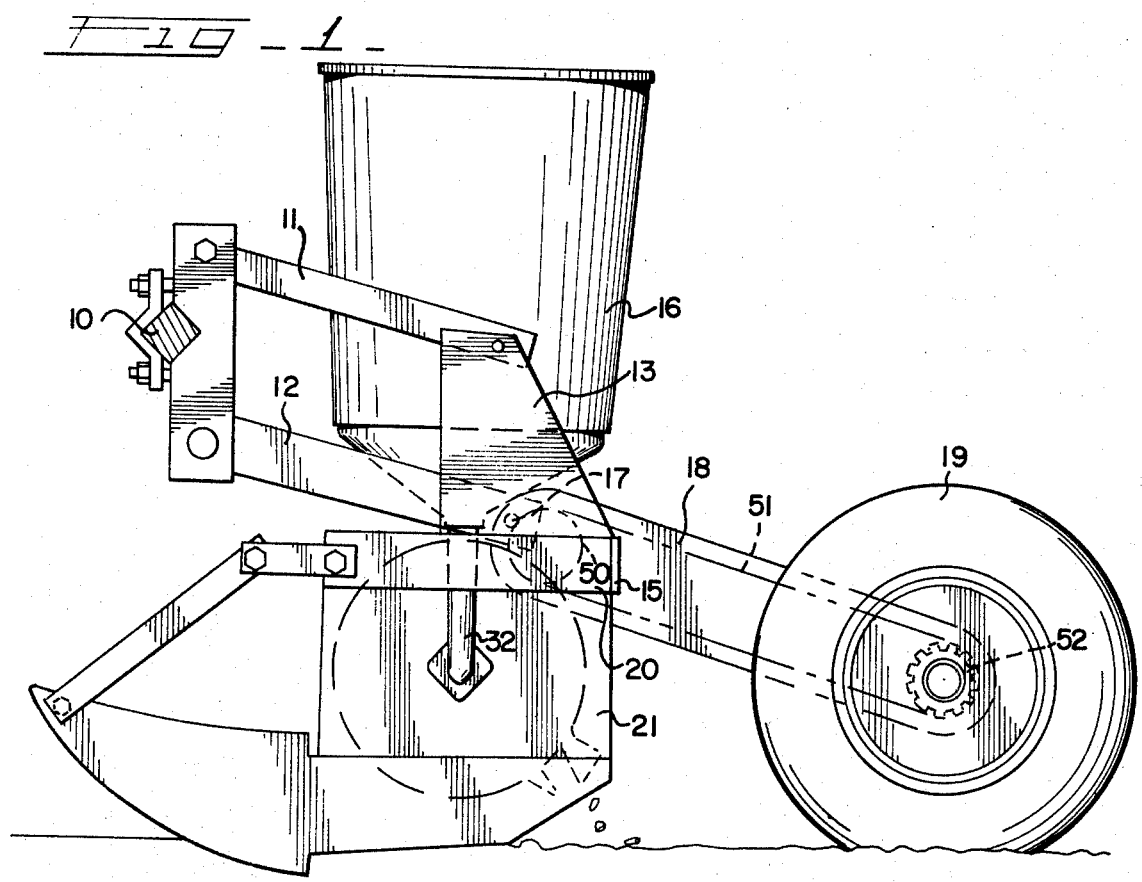
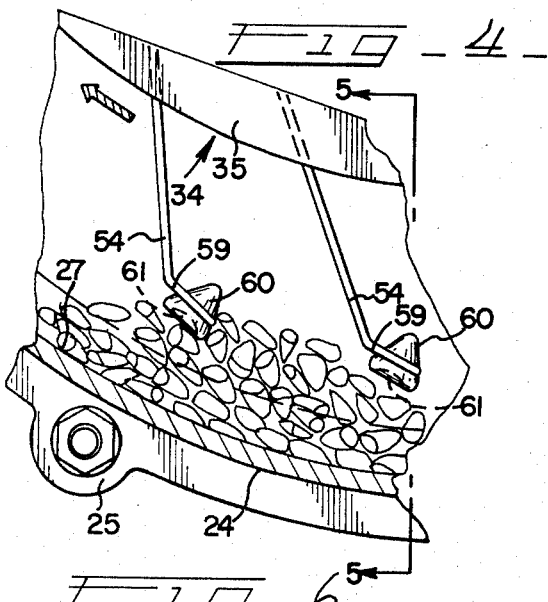
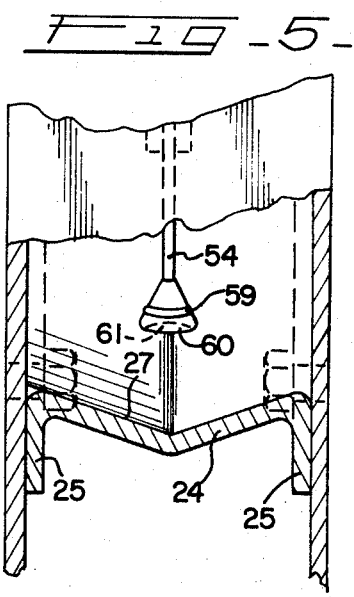
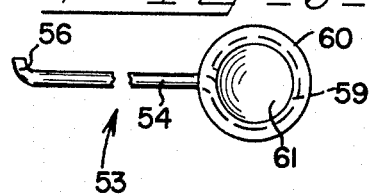
INVENTORS
DARLO E. LIENEMANN
DANIEL HENRY

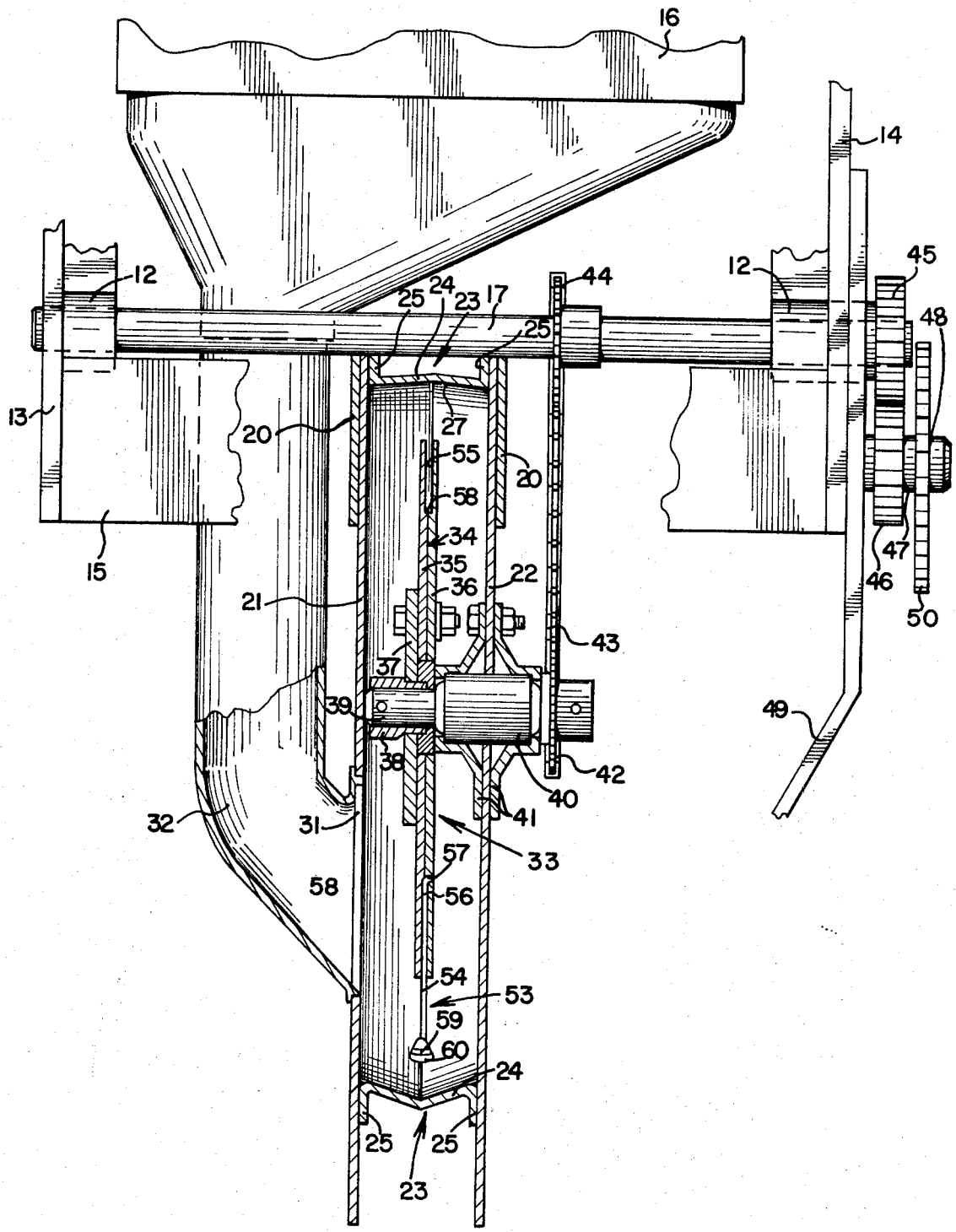

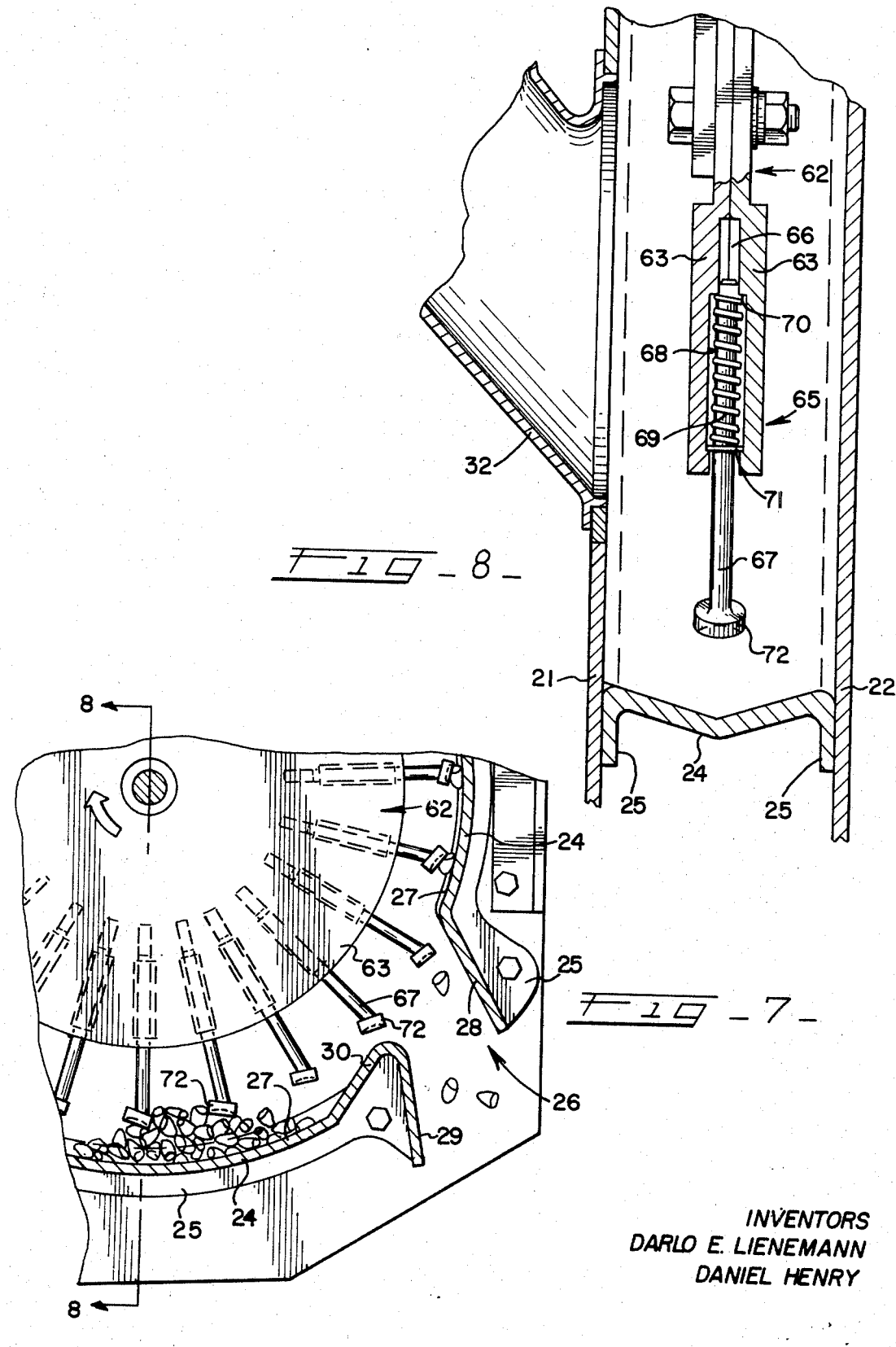

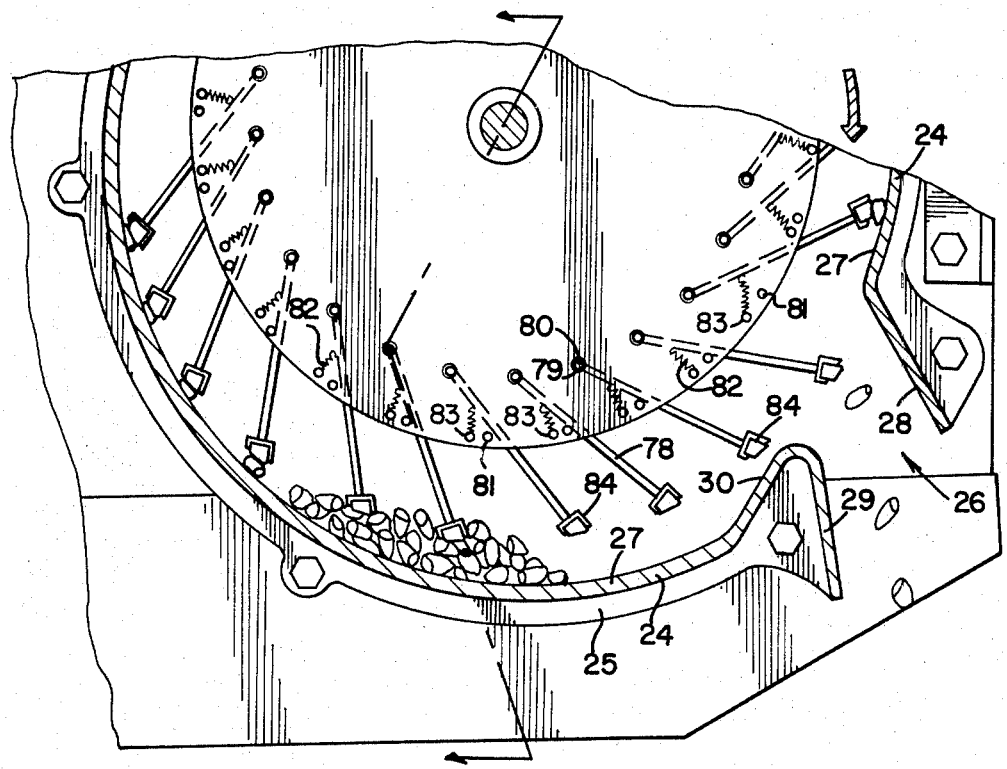
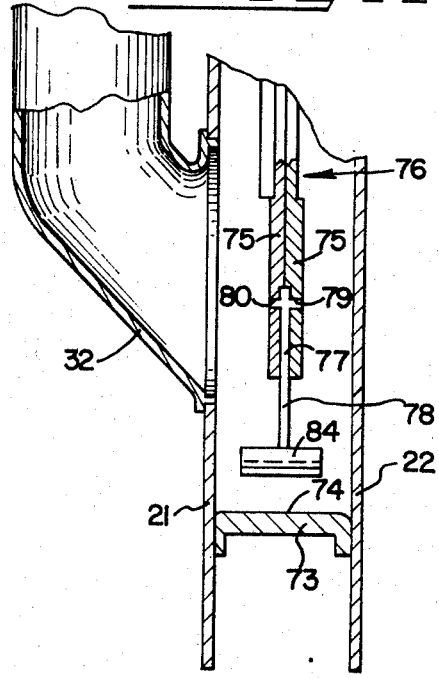
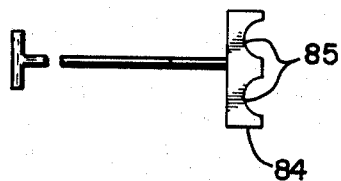
INVENTORS
DARLO E. LIENEMANN
DANIEL HENRY

PLANTER

BACKGROUND OF THE INVENTION

This invention relates to planters and particularly to improved seed metering mechanism therefor. More specifically, the invention concerns improved planting mechanism for seeds of varying size and shape.

In conventional planters a rotatable seed wheel or plate is provided having peripheral cells of a selected size to plant graded seed of uniform size. Inasmuch as seed such as corn, for example, supplied to the farmer varies considerably in size and shape, a wide selection of seed plates is also offered so the size of the cells can be matched to the size of seed to be planted. The economies effected by a planter capable of selecting and dispensing seed from an ungraded supply are obvious, and this invention has for its object the provision of a novel planter adapted to dispense seed irrespective of its size and shape.

Another object of the invention is the provision of novel seed metering mechanisms wherein a rotatable seed wheel or rotor is provided with generally radially outwardly biased seed engaging fingers and is mounted in a housing having a wall forming a cam surface, wherein each finger passing through the seed supply in the housing presses a seed against said wall and holds it there during rotation of the rotor until an opening in said wall relieves pressure of the fingers thereagainst and allows them to eject the seed.

DESCRIPTION OF THE DRAWINGS

FIG. 1 diagrammatically illustrates a side elevational view of a portion of a planter unit having seed selecting and dispensing means therein incorporating the features of this invention;

FIG. 3 is a section taken on line 3-3 of FIG. 2;

FIG. 4 is a partial view in side elevation of the seed selecting portion of the structure shown in FIGS. 1, 2, and 3;

FIG. 5 is a section taken on line 5—5 of FIG. 4;

FIG. 6 is an enlarged diagrammatic detail of a seed engaging pad;

FIG. 7 is a diagrammatic view in side elevation, with parts removed, of a modified form of the invention shown in FIGS. 1, 2, and 3;

FIG. 8 is a section taken on line 8—8 of FIG. 7;

FIG. 9 is a diagrammatic view in side elevation, with parts removed, showing another modified form of the invention shown in FIGS. 1, 2, and 3;

FIG. 10 is a section taken on line 10—10 of FIG. 9; and

FIG. 11 is a diagrammatic detail of a modified form of seed engaging pad.

Figure 2:
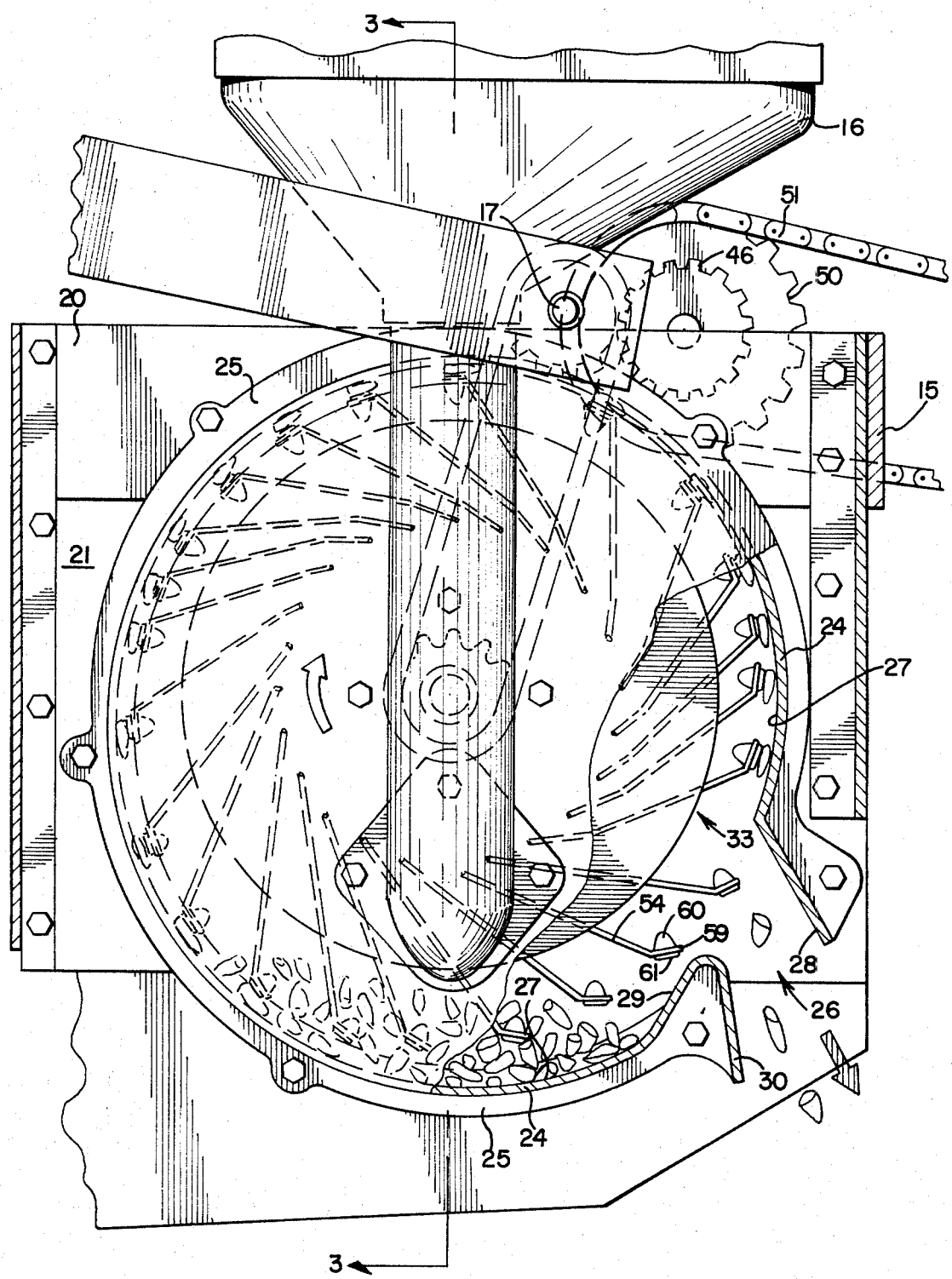
FIG. 2 is a diagrammatic view in side elevation, with parts removed, of a portion of the structure shown in FIG. 1.

It is believed that the construction and operation of the novel planter mechanism of this invention will be clearly understood from the foregoing description.

DESCRIPTION OF THE PREFERRED EMBODIMENT

The planter unit shown diagrammatically in FIG. 1 is mounted in well known manner on a tool bar 10 by parallel links 11 and 12 accommodating vertical movement of the unit. Forming part of the planter unit are spaced upright frame members 13 and 14 pivotally connected to the rear ends of links 11 and 12, the lower ends of members 13 and 14 being connected by a cross brace 15, upon which is mounted a seed hopper 16. A transverse shaft 17 extends between the lower portion of members 13 and 14 and serves for the pivotal mounting of the rear end of link 12 and also for the pivotal mounting of the forward end of a supporting arm 18 carrying a press wheel 19.

Affixed to and extending forwardly from cross brace 15 is a pair of rails 20 to which are secured the spaced apart depending side plates 21 and 22 between which is mounted a drum 23 comprising a generally C-shaped peripheral wall 24, and flanges 25 secured to side walls or plates 21 and 22. Wall 24 has an inner cam surface 27 including a helix portion and the end thereof nearest the axis of the drum is turned outwardly to form with plates 21 and 22 one wall 28 of a chute. The other end of wall 24 is angled inwardly at 29 and outwardly at 30 to form the other wall of the chute comprising seed discharge opening or outlet 26.

Side plate 21 has an opening 31 formed therein in which is received the lower end of a guide tube 32 through which seed discharged from hopper 16 is directed to the lower portion of the drum 23 to form a seed supply.

Seed in the supply at the lower portion of housing 23 is metered and discharged through said discharge opening 26 and into a formed furrow by the provision of a rotary seed selector wheel generally designated at 33 and comprising a rotor portion 34 formed of a pair of discs 35 and 36 secured to a hub 37 having a bearing portion 38 affixed to one end of a shaft 39 rotatable in a bearing 40 received in an opening in plate 22 and carried by brackets 41 secured to the plate.

The other end of shaft 39 has secured thereto a sprocket wheel 42 drivingly connected by a chain 43 to another sprocket wheel 44 mounted on shaft 17, drive being transmitted through shaft 17 to seed wheel 33 in well known manner by the provision at one end of shaft 17 of a gear 45 meshing with another gear 46 having a bearing portion 47 mounted on a stub shaft 48 projecting from a leg 49 depending from support member 14. Also secured to bearing 47 is a sprocket wheel 50 drivingly connected by a chain 51, shown diagrammatically in FIGS. 1 and 2 with a sprocket wheel 52 driven by engagement of press wheel 19 with the ground.

In FIGS. 1 and 2 the seed selecting and ejecting wheel 33 is shown as including a plurality of circumferentially spaced seed selecting members 53 preferably in the form of a flexible rod having a main body 54, a portion of which is received in a circumferentially formed slot 55 in the periphery of rotor 34 between discs 35 and 36, and the inner end 56 of each member 53 is bent axially for reception in an opening provided in disc 36 to anchor member 53.

The inner end 56 of each member 53 is received in an opening 57 formed tangentially in rotor 34 inwardly of a shoulder 58 forming the inner periphery of circumferential slot 55.

Each member 53 constitutes a seed engaging finger including seed selecting means at the outer end thereof. The radially outer end of rod 54 is bent to form an eye 59 to seat a cup-like member 60 having a depressed outer surface 61 adapted to engage a seed, as best shown in FIGS. 4, 5, and 6.

Cam surface 27, as best seen in FIG. 2, has a generally cylindrical portion starting at end 29 and proceeding in a clockwise direction to about the 12 o'clock position at which point a helical portion begins and the radius diminishes as wall 28 is approached. The rotary axis for seed wheel 33 does not coincide with the axis of the cylindrical portion of surface 27 and the part of the wall 27 farthest from the axis of seed wheel 33 is that part adjacent the inwardly directed end 29. At this farthest point wall 27 is spaced from the ends of seed selecting members 53. The radius of the helical portion of wall 27 decreases in the direction of rotation of wheel 33, as indicated by the arrow in FIG. 2, and as the end of each finger enters the seed supply it engages a seed and presses it against the inner periphery 27 of wall 24. As the radius of the wall becomes smaller, shoulder 58 as shown in FIG. 3, provides a bearing surface to cause the finger 53 to be bent as indicated in FIG. 2 at the upper portion of the housing, pressing the seed against the cam surface formed by wall 24 against the bias in the spring.

The seed is rubbed over the inner surface 27 until the opening 26 is reached, whereupon the tension in the spring is released and the seed is ejected, in the manner indicated, to the ground.

In the modification of the invention shown in FIGS. 7 and 8 a rotor 62 is provided wherein juxtaposed discs 63 are upset axially as indicated in FIG. 8 to provide a broadened radially outer annular section 65 wherein circumferentially spaced radially disposed openings 66 are formed to slidably receive plungers 67.

A recessed portion 68 houses a coil spring 69 surrounding the inner portion of plunger 67 and engages at one end a shoulder 70 and at its other end a collar 71 secured to the plunger. Each plunger is biased to its extended position as shown in the drawings and its outer end is provided with seed selecting means in the form of an angled cup shaped seed engaging pad 72, the outer surface of which engages a seed in the supply during rotation of the seed wheel and presses the seed against the cam surface 27 and holds the seed on said surface against the bias of spring 69 in the manner shown for the seed selecting members 53 of FIGS. 2 through 6. Similarly, when the plungers reach the end of wall 24 spring 69 forces the plunger radially outwardly and ejects the seed through outlet 26.

In the forms of the invention illustrated in FIGS. 1 to 8, seed selecting fingers are provided having single seed selecting pads, as 60 and 72, for selecting and ejecting one seed for each finger. In these cases the wall is somewhat V-shaped as indicated in FIGS. 3, 5, and 8 to provide a shallow trough, which is most pronounced at the bottom of the housing, to facilitate the entrapment of seed between the seed selecting finger and the cam surface.

In the form of the invention shown in FIGS. 9, 10, and 11 a modified wall 73 is provided having a flattened cam surface 74 as indicated in FIG. 10. In this case the two discs 75 of rotor 76 are provided with a circumferential slot 77. Circumferentially spaced seed selecting fingers 78 are received in slot 77 and project tangentially therefrom in the manner of the fingers 53 in FIG. 3. However, in contrast with fingers 53, fingers 78 are of relatively rigid material, and at the inner end of each finger 78 is an axially extending pivot bar 79 receivable in a recess 80 accommodating pivoting of each seed selecting member.

As best shown in FIG. 9, a stop 81 in the form of a pin extending between plates 75 adjacent the periphery of the rotor is engageable with the finger 78 to limit its pivoting in one direction. Each finger 78 is biased against its associated stop 81 by the provision of a spring 82 having one end anchored to a pin 83 extending between the discs 75, and its other end anchored to the finger.

In the form of the invention shown in FIGS. 9 to 11 more than one seed can be selected by the seed selecting means from the supply and simultaneously ejected. An axially broadened seed engaging pad 84 is affixed to the outer end of each finger 78, and as indicated, FIG. 11 is provided with a pair of arcuate depressions 85 to receive a pair of seeds and to press them against the cam surface 74. It is obvious, of course, that by enlarging the pad 84 additional seed cups 85 may be provided to select and simultaneously eject more than two seeds.

What is claimed is:

1. Seed selecting and ejecting means for a planter comprising a housing including a generally C-shaped wall, the gap in said generally C-shaped wall defining a seed discharge opening, a rotor mounted in the opening about an axis spaced from the center of said generally C-shaped wall, a plurality of seed engaging members carried by the rotor arranged at circumferentially spaced locations thereabout and biased radially outwardly therefrom when said seed engaging members are in direct or indirect engagement through seed with the generally C-shaped wall, a seed supply disposed between the rotor and said wall in the path of and engageable by successive of said seed engaging members during rotation of the rotor, each said seed engaging member including seed selecting means that function to trap a seed therebetween and said C-shaped wall and to retain the seed by virtue of the bias of the seed engaging member during rotation of the rotor and to release the seed at and through said opening, said generally C-shaped wall being eccentric with respect to the axis of said rotor and said seed supply is deposited in the area of greatest spacing between the rotor and the generally C-shaped wall and wherein one of the edges of said generally C-shaped wall defining said seed discharge opening is an element of a portion of said wall nearest the axis of the rotor and the other such edge is an element adjacent to the wall furthest from said axis.

2. The invention set forth in claim 1, wherein said generally C-shaped wall includes a portion that is substantially in the form of a helix wherein the ends of said wall are separated circumferentially and radially to define said seed discharge opening.

3. The invention set forth in Claim 1, wherein the offset between the center of said generally C-shaped wall and said rotor along with the curvature of said generally C-shaped wall is such that the distance between the axis of the rotor and the generally C-shaped wall decreases between the seed supply and said seed discharge outlet progressively increasing the bias on said seed engaging members.

* * * * *